US009128685B2

(12) United States Patent
Choi

(10) Patent No.: US 9,128,685 B2
(45) Date of Patent: Sep. 8, 2015

(54) MOBILE TERMINAL

(71) Applicant: LG Electronics Inc., Seoul (KR)

(72) Inventor: Chealhoon Choi, Incheon (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 13/829,646

(22) Filed: Mar. 14, 2013

(65) Prior Publication Data
US 2013/0250504 A1 Sep. 26, 2013

(30) Foreign Application Priority Data

Mar. 22, 2012 (KR) ........................ 10-2012-0029578

(51) Int. Cl.
H05K 7/20 (2006.01)
H05K 9/00 (2006.01)
G06F 1/20 (2006.01)

(52) U.S. Cl.
CPC ...................................... G06F 1/203 (2013.01)

(58) Field of Classification Search
CPC ........................................................ G06F 1/203
See application file for complete search history.

(56) References Cited

U.S. PATENT DOCUMENTS

| | | | | |
|---|---|---|---|---|
| 5,581,443 A * | 12/1996 | Nakamura et al. | ............. | 361/705 |
| 5,831,831 A * | 11/1998 | Freeland | ........................ | 361/704 |
| 6,011,691 A * | 1/2000 | Schreffler | ....................... | 361/704 |
| 6,215,180 B1 * | 4/2001 | Chen et al. | ..................... | 257/720 |
| 6,400,577 B1 * | 6/2002 | Goodwin et al. | ............. | 361/816 |
| 6,809,931 B2 * | 10/2004 | Dove et al. | ..................... | 361/707 |
| 6,933,990 B2 * | 8/2005 | Park | ................................ | 349/59 |
| 7,306,847 B2 * | 12/2007 | Capp et al. | ..................... | 428/408 |
| 7,312,998 B2 * | 12/2007 | Kamemoto et al. | .......... | 361/719 |
| 7,315,451 B2 * | 1/2008 | Kim et al. | ..................... | 361/704 |
| 7,323,808 B2 * | 1/2008 | Kim et al. | ....................... | 313/44 |
| 7,330,354 B2 * | 2/2008 | Watanabe | ..................... | 361/705 |
| 7,381,906 B2 * | 6/2008 | Holmberg | ..................... | 174/385 |
| 7,530,703 B2 * | 5/2009 | Ryu | ................................. | 362/29 |
| 7,551,451 B2 * | 6/2009 | Kim et al. | ..................... | 361/752 |
| 7,623,360 B2 * | 11/2009 | English et al. | ................ | 361/816 |
| 7,663,730 B2 * | 2/2010 | Shibata | ......................... | 349/161 |
| 7,764,493 B2 * | 7/2010 | Ali et al. | ................... | 361/679.51 |
| 7,903,422 B2 * | 3/2011 | Watanabe | ..................... | 361/719 |
| 7,928,643 B2 * | 4/2011 | Shin | .............................. | 313/269 |
| 7,969,739 B2 * | 6/2011 | Tsunoda et al. | .............. | 361/704 |
| 8,134,840 B2 * | 3/2012 | Yoshida et al. | .............. | 361/752 |
| 8,299,608 B2 * | 10/2012 | Bartley et al. | ................ | 257/712 |
| 8,422,234 B2 * | 4/2013 | Goriaux et al. | ............... | 361/720 |
| 2004/0037042 A1 * | 2/2004 | Hockanson et al. | .......... | 361/704 |
| 2004/0080917 A1 * | 4/2004 | Steddom et al. | .............. | 361/748 |
| 2005/0088097 A1 * | 4/2005 | Bae et al. | ....................... | 313/587 |
| 2005/0270746 A1 * | 12/2005 | Reis | ................................ | 361/708 |
| 2006/0126310 A1 * | 6/2006 | Watanabe | ..................... | 361/720 |
| 2010/0126708 A1 * | 5/2010 | Mikami | ......................... | 165/185 |

\* cited by examiner

Primary Examiner — Hoa C Nguyen
Assistant Examiner — Xanthia C Cunningham
(74) Attorney, Agent, or Firm — Birch, Stewart, Kolasch & Birch, LLP

(57) ABSTRACT

A mobile terminal is provided. The mobile terminal includes a terminal body, a display module located in the terminal body, a printed circuit board located within the terminal body, at least one electric device mounted on the printed circuit board, a sealing unit coupled to the printed circuit board to shield the electric device, a frame having a first surface contacting the sealing unit and a second surface coupled to the display module and a first heat transfer portion to radiate heat generated by the electric device.

14 Claims, 7 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0029578, filed on Mar. 22, 2012, the contents of which is incorporated by reference herein in its entirety.

BACKGROUND OF THE INVENTION

1. Field of the Invention

This specification relates to a heat radiation structure for a mobile terminal.

2. Description of Related Art

As it becomes multifunctional, a mobile terminal can be allowed to capture still images or moving images, play music or video files, play games, receive broadcast and the like, so as to be implemented as an integrated multimedia player.

Terminals may be divided into mobile/portable terminals and stationary terminals according to their mobility. Mobile terminals (mobile device, portable device, portable terminal) can be easily carried and have one or more of functions such as supporting voice and video telephony calls, inputting and/or outputting information, storing data and the like.

Many efforts are undergoing to support or enhance various functions of such mobile terminals. Such many efforts include not only changes and improvement of structural components implementing a mobile terminal but also software or hardware improvement.

Especially, as a trend of the mobile terminal changes to an LTE service and a smart phone, degradation of a performance and consumers' inconvenience are caused due to internal heat generation. A smart phone which may require for data processing (LTE) reaching even 100 Mbps and performance similar to a PC operates at more than 1 GHz clock speed, which causes generation of heat, resulting in a severe problem.

In the conventional method, heat generated by an internal CPU is transferred to a heat sink attached onto the CPU. The heat transferred to the heat sink is cooled by convection contact with air, thereby cooling the CPU. However, in the mobile terminal which generally requires a hermetic structure in order to prevent an introduction of particulates and guarantee device reliability with a ultra-thin structure, external radiation of heat in a manner of conduction is the only way.

Therefore, a mobile terminal having a more improved heat radiation structure may be taken into account.

BRIEF SUMMARY OF THE INVENTION

Therefore, an aspect of the detailed description is to provide a mobile terminal having a heat radiation structure different from the related art.

To achieve these and other advantages and in accordance with the purpose of this specification, as embodied and broadly described herein, there is provided a mobile terminal including a terminal body having a display module, a printed circuit board mounted within the body and having at least one electric device mounted thereon, a sealing unit coupled to the printed circuit board to shield the electric device, and a frame having a first surface contacting the sealing unit and a second surface coupled with the display module, wherein a first heat transfer portion for transferring heat from the sealing unit to the frame may be formed on the first surface, and a heat transfer preventing portion for reducing heat transferred from the frame to the display module may be formed on the second surface to correspond to the first heat transfer portion.

In accordance with one exemplary embodiment, the frame may have at least part exposed to the exterior.

In accordance with one exemplary embodiment, the display module may be coupled to the frame by an adhesive member, which is formed on a predetermined region of the second surface excluding a region having the heat transfer preventing portion.

In accordance with one exemplary embodiment, the heat transfer preventing portion may include an air gap formed to space the frame apart from the display module.

In accordance with one exemplary embodiment, the heat transfer preventing portion may include an insulator interposed between the frame and the display module.

In accordance with one exemplary embodiment, the printed circuit board may be disposed between a case for receiving a battery therein and the frame, and a battery case may be formed to cover the battery and the case.

In accordance with one exemplary embodiment, the mobile terminal may further include a protrusion formed on a predetermined region of an inner surface of the battery case, in correspondence with a region having the first heat transfer portion, such that an air gap is formed between the case and the battery case.

In accordance with one exemplary embodiment, the mobile terminal may further include an insulator formed on a predetermined region of an inner surface of the battery case, in correspondence with a region having the first heat transfer portion, so as to prevent heat from being transferred to an outer surface of the battery case.

In accordance with one exemplary embodiment, the mobile terminal may further include a second heat transfer portion to transfer heat from the electric device formed on one surface within the sealing unit to the sealing unit, and heat conductivity of the second heat transfer portion may be higher than that of the first heat transfer portion.

A mobile terminal in accordance with another exemplary embodiment to achieve these and other advantages and in accordance with the purpose of this specification may include a terminal body having a display module, a printed circuit board mounted within the body and having at least one electric device mounted thereon, a sealing unit coupled to the printed circuit board to shield the electric device, and a frame having one surface provided with a heat transfer portion coupled to the sealing unit to radiate heat generated from the electric device, and another surface coupled with an insulator to reduce heat transferred to the display module.

A mobile terminal in accordance with another exemplary embodiment to achieve these and other advantages and in accordance with the purpose of this specification may include a terminal body having a display module, a printed circuit board mounted within the body and having at least one electric device mounted thereon, and a frame coupled to a sealing unit for shielding the electric device and a first heat transfer portion to radiate heat generated from the electric device, and forming an air gap together with the display module to reduce heat transferred to the display module.

In a mobile terminal according to at least one exemplary embodiment of the present disclosure, an increase in internal temperature of the terminal due to heat generation by an electric device may be prevented within a predetermined range.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile phones, smart phones, notebook computers, digital broadcast terminals, Personal Digital Assistants (PDA), Portable Multimedia Players (PMP), navigators and the like. The following description assumes that the terminal is a mobile terminal. However, it can be easily understood by those skilled in the art that the configuration according to the following description can be applied to the stationary terminals, such as digital TVs, desktop computers and the like, except for components particularly provided for mobility.

Figure 1:
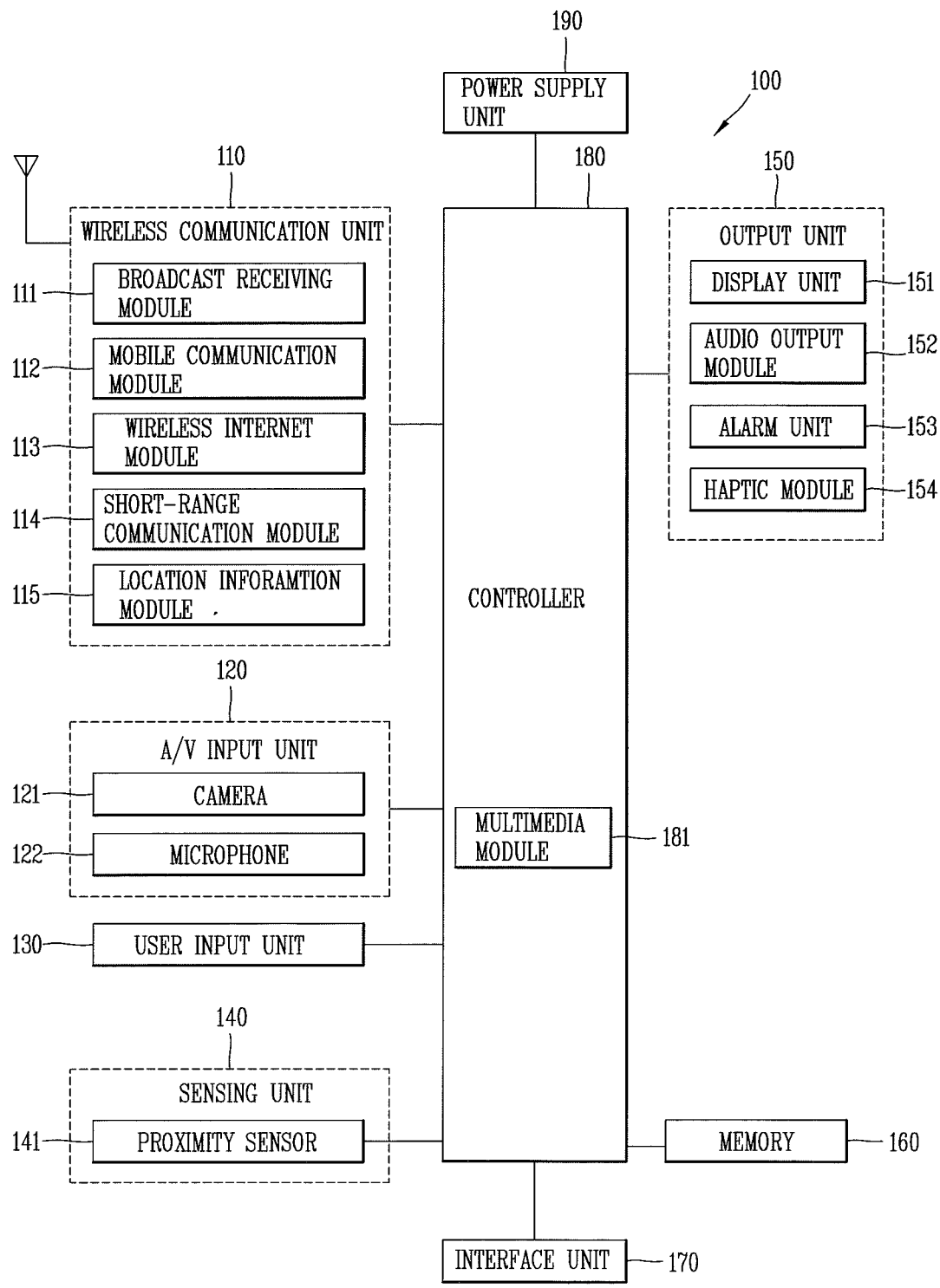
FIG. 1 is a block diagram of a mobile terminal in accordance with one exemplary embodiment.

FIG. 1 is a block diagram of a mobile terminal 100 in accordance with one embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented. The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on the display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

Examples of the proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
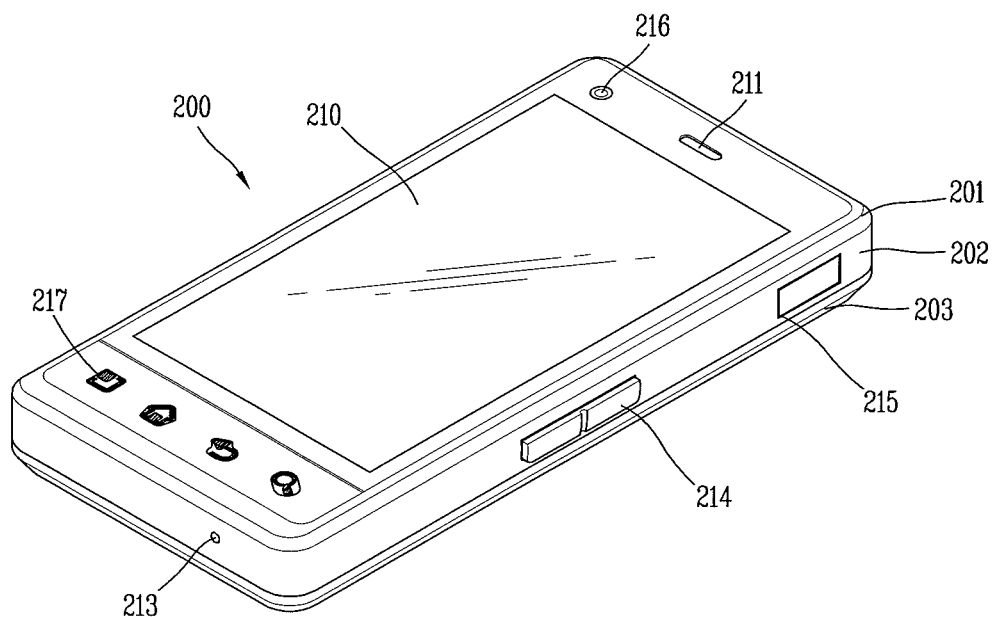
FIG. 2 is a front perspective view of the mobile terminal.
Figure 3:
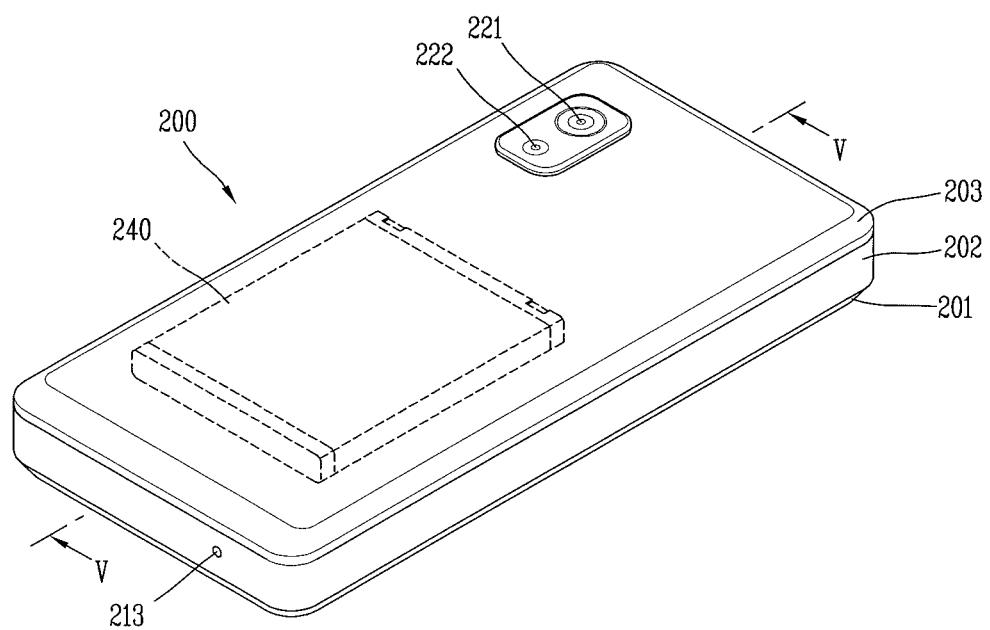
FIG. 3 is a rear perspective view of the mobile terminal shown in FIG. 2.

FIG. 2 is a front perspective view showing an example of the mobile terminal, and FIG. 3 is a rear perspective view of the mobile terminal of FIG. 2. The mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner. In addition, the mobile terminal described herein may also be applied to portable electronic devices having a camera and flash, for example, smart phones, cellular phones, notebook computers, digital broadcast terminals, Personal Digital Assistants (PDAs), Portable Multimedia Player (PMO) and the like.

The terminal body may include a case (or referred to as casing, housing, cover, etc.) defining an appearance of the mobile terminal 200. In this exemplary embodiment, the case may be divided into a front case 201, a rear case 202 for shielding a surface opposite to the front case 201, and a battery cover 203 coupled to the rear case 202 to define a rear surface of the mobile terminal 200. A space formed between the front and rear cases 201 and 202 may accommodate various electronic components. Such cases may be injected using a synthetic resin or be formed of a metal, such as stainless steel (STS), titanium (Ti) or the like.

The front surface of the terminal body may include a display unit 210, a first audio output module 211, a front camera 216, a side key 214, an interface unit 215 and a signal input unit 217.

The display unit 210 may include an LCD module, an OLED module, an e-paper and the like to output visual information. The display unit 210 may include a touch sensing unit to input information in a touching manner. Hereinafter, the display unit 210 having the touch sensing unit may be referred to as 'touch screen.' When a touch input is sensed on a portion on the touch screen 210, contents corresponding to the touched position may be inputted. The contents inputted in the touching manner may be text or numerals, or menu items which may be indicated or set in various modes. The touch sensing unit may be transparent such that the display module can be visible, and include a structure for enhancing visibility of the touch screen at a bright place. Referring to FIG. 2, the touch screen 210 may occupy most of the front surface of the front case 201.

The first audio output module 211 may be implemented as a receiver to transfer a call sound to a user's ear, or a loud speaker for outputting various alarm sounds or multimedia reproduction sounds.

The front camera 216 may receive and process image frames of still pictures or video obtained by image sensors in a video call mode or a capturing mode. The processed image frames may be displayed on the display unit 210.

The image frames processed by the front camera 216 may be stored in the memory 160 or transmitted to an external device through the wireless communication unit 110. Two or more front cameras 216 may be provided according to the use environment of the mobile terminal.

The signal input unit 217 may be manipulated to allow inputting of commands for controlling operations of the mobile terminal 200, and include a plurality of input keys. The plurality of input keys may be referred to as a manipulating portion. Such manipulating portion can employ any tactile manner that a user can touch or tap for manipulation.

For instance, the manipulating portion may be implemented as a dome switch, a touchpad, a touchpad or the like by which a user can input commands or information in a pushing or touching manner. Alternatively, the manipulating portion may be implemented as a wheel or a jog which rotates keys or a joystick. Contents inputted by the signal input unit 217 may be set in various manners. For example, the signal input unit 217 may be to input commands such as START, END, SCROLL or the like.

A side surface of the front case 201 is shown having the side key 214, the interface unit 215, an audio input unit 213 and the like.

The side key 214 may be referred to as a manipulation unit, and allowed to receive command for controlling operations of the mobile terminal 200. The side key 214 may employ any tactile manner that a user can touch or tap for manipulation. Contents inputted by the side key 214 may be set in various manners. For example, the side key 214 may be configured to input commands, such as a control of the image input units 216, 221, a volume adjustment of sounds output from the audio output module 211, conversion of the display unit 210 into a touch recognition mode, or the like.

The audio input unit 213 may be implemented, for example, as a microphone for receiving user's voice, other sounds and the like.

The interface unit 215 may serve as a path for data exchange between the mobile terminal 200 and external devices. For example, the interface unit 121570 may be at least one of wired/wireless earphone ports, ports for short-range communication (e.g., IrDA, Bluetooth, WLAN, etc.), power supply terminals for power supply to the mobile terminal and the like. The interface unit 215 may be a card socket for coupling to external cards, such as a Subscriber Identity Module (SIM), a User Identity Module (UIM), a memory card for storage of information and the like.

A rear surface of the terminal body is shown having a power supply unit 240, and a rear camera 221.

A flash 222 and a mirror (not shown) may additionally be disposed adjacent to the rear camera 221. The flash 222 operates in conjunction with the rear camera 221 when taking a picture using the rear camera 221.

The mirror can cooperate with the rear camera 221 to allow a user to photograph himself in a self-portrait mode.

The rear camera 221 faces a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front and rear cameras 216 and 221 may be installed in the terminal body to be rotatable or popped up.

The battery 240 for supplying power to the mobile terminal 200 may be mounted in the terminal body. The battery 240 may be mounted in the terminal body or detachably coupled directly onto the outside of the terminal body.

Figure 4:
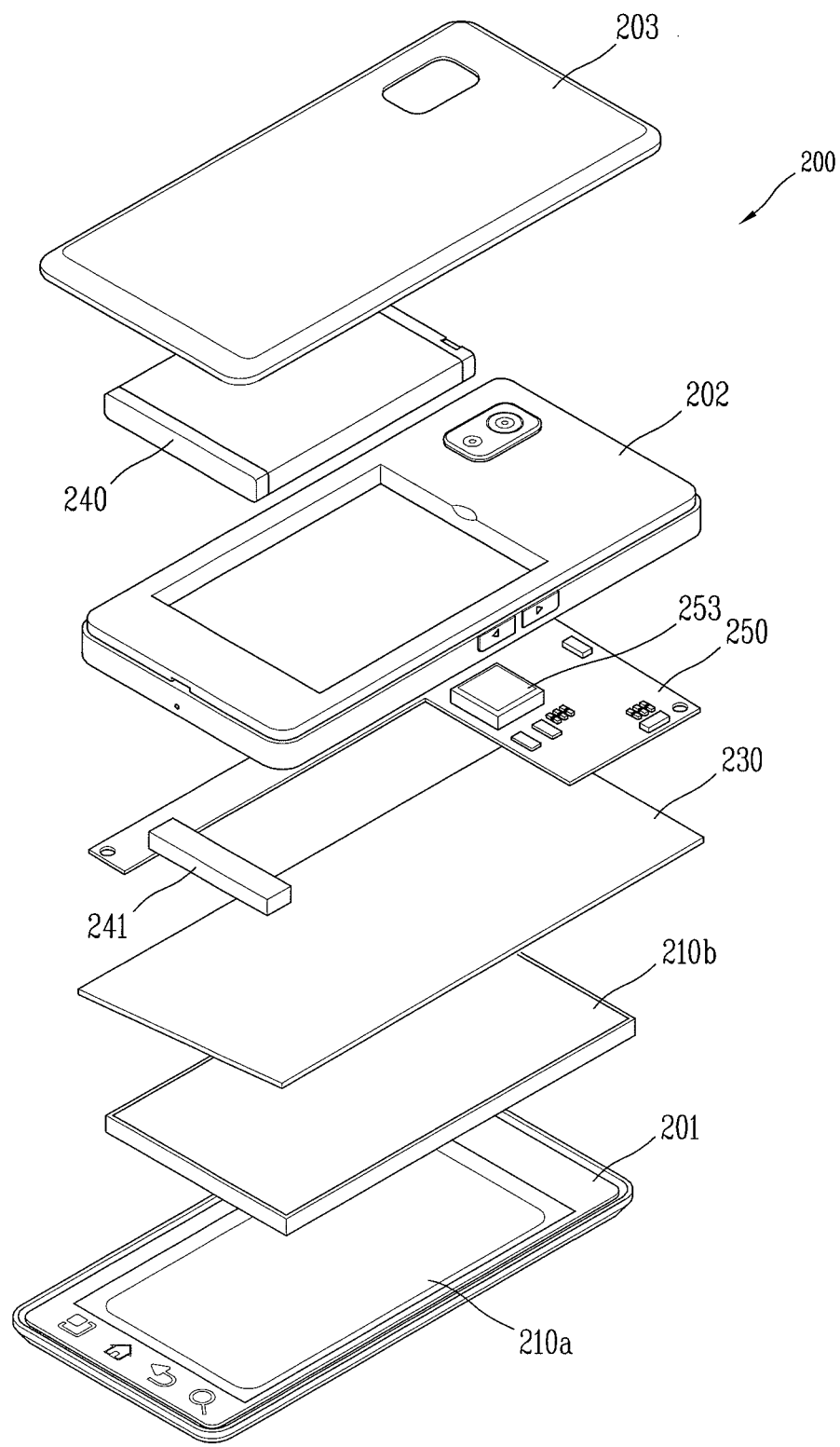
FIG. 4 is a view showing a coupling relation of a printed circuit board, a sealing unit and a frame of the mobile terminal, namely, a disassembled perspective view of FIG. 3.
Figure 5:
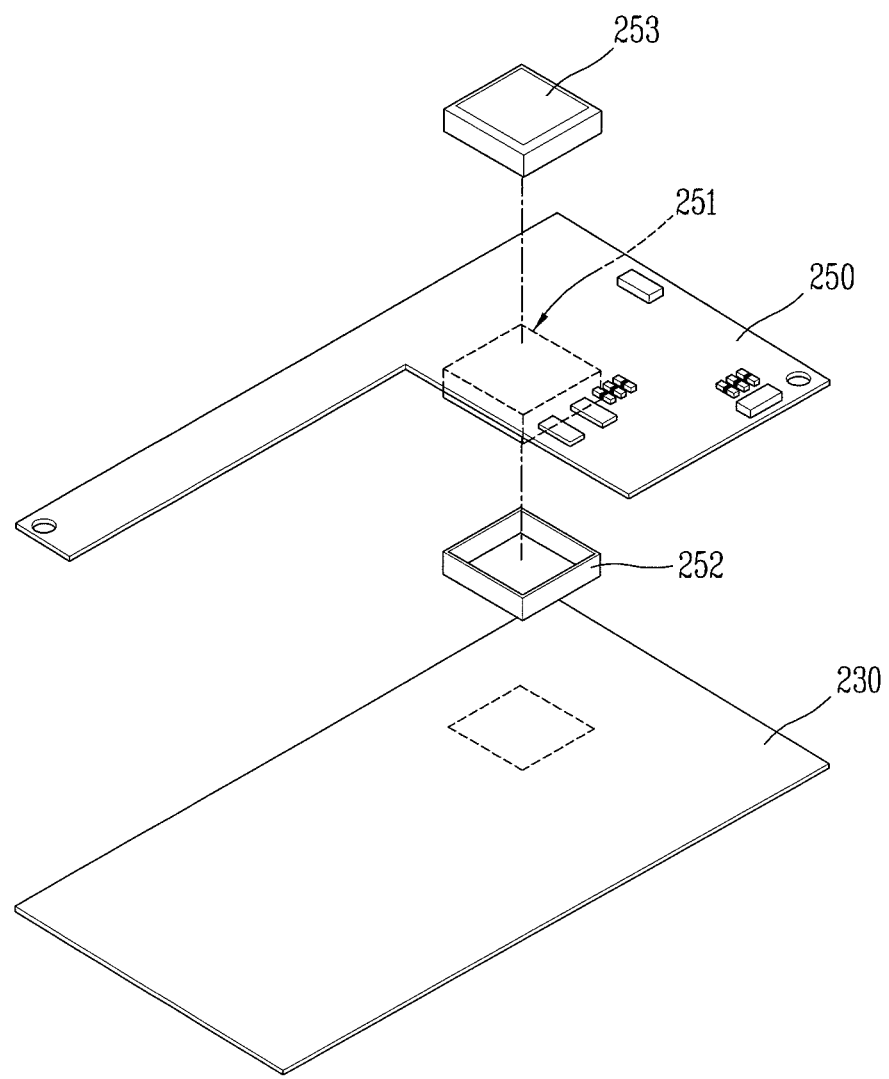
FIG. 5 is a view showing the printed circuit board, the sealing unit and the frame shown in FIG. 4.
Figure 6:
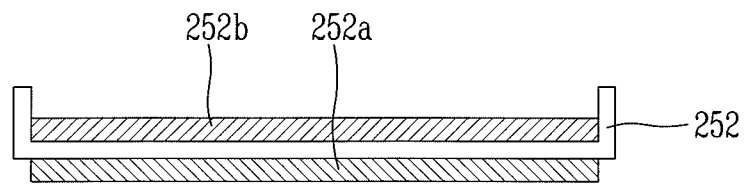
FIG. 6 is a sectional view of a first sealing portion shown in FIG. 5.
Figure 7:
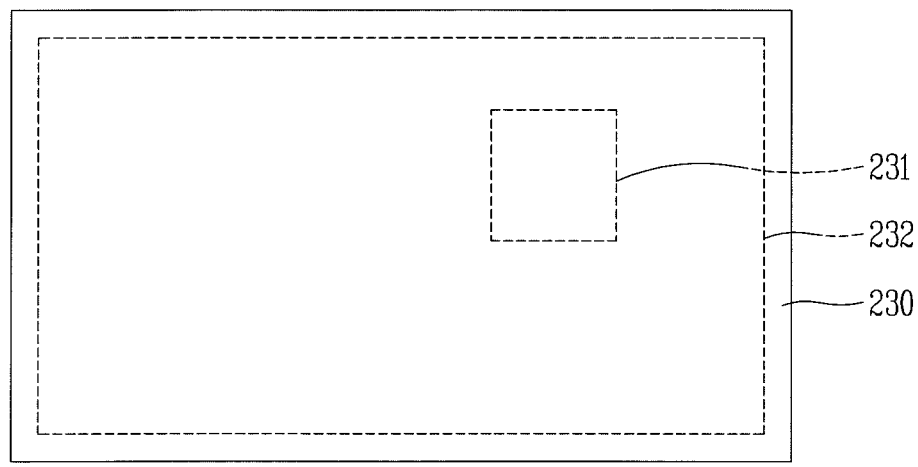
FIG. 7 is a front view of the frame shown in FIG. 5.
Figure 8:
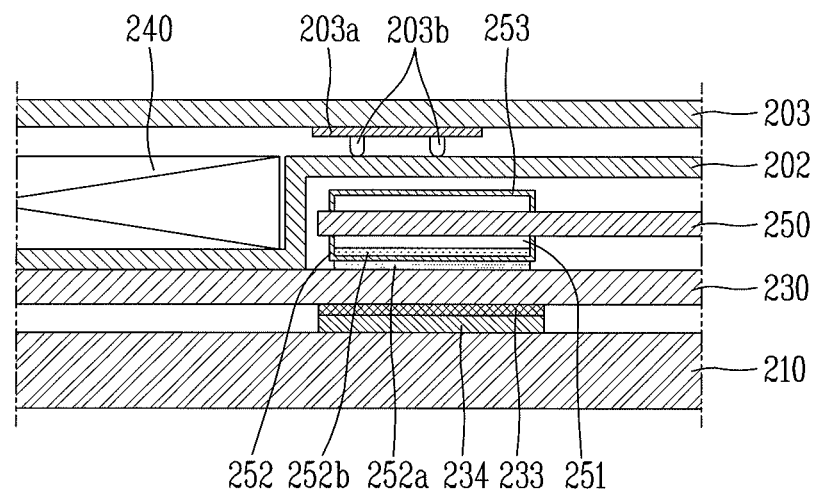
FIG. 8 is a sectional view taken along the line V-V of FIG. 3.

FIG. 4 is a view showing a coupling relation of a printed circuit board, a sealing unit and a frame of the mobile terminal, namely, a disassembled perspective view of FIG. 3. FIG. 5 is a view showing the printed circuit board, the sealing unit and the frame shown in FIG. 4. FIG. 6 is a sectional view of a first sealing portion shown in FIG. 5. FIG. 7 is a front view of the frame shown in FIG. 5. FIG. 8 is a sectional view taken along the line V-V of FIG. 3.

Referring to FIG. 4, the mobile terminal may include a window 210a and a display module 210b which are coupled to one surface of the front case 201 to configure the display unit 210. The front case 201 and the rear case 202 may define an appearance of the terminal. A frame 230 for supporting electric devices may be formed between the front case 201 and the rear case 202. The frame 230 is a support structure within the terminal. As one example, the frame 230 may be formed to support at least one of the display module 210b, a camera module, an antenna device 241 or a printed circuit board 250.

The frame 230 may be partially exposed to the outside of the terminal. Also, the frame 230 may configure a part of a sliding module which connects a main body of the terminal to the display unit in a slide type terminal other than the bar type terminal.

In one example shown in FIG. 4, the printed circuit board 250 may be disposed between the frame 230 and the rear case 202, and the display module 210b may be coupled to one surface of the frame 230. The printed circuit board 250 and a battery 240 may be disposed on another surface of the frame 230, and the battery case 203 may be coupled to the rear case 202 to cover the battery 240.

The window 210a may be coupled to one surface of the front case 201. A touch sensor (not shown) may be mounted onto the window 210a. The touch sensor may sense a touch input and be transparent. The touch sensor may be mounted onto the front surface of the window 210a to convert the change of a voltage or the like, which is generated on a specific portion of the window 210a, into an electric input signal.

The display module 210b may be mounted onto a rear surface of the window 210a. In this exemplary embodiment, a thin film transistor-liquid crystal display (TFT-LCD) is illustrated as an example of the display module 210b, but the present disclosure may not be limited to the type.

Examples of the display module 210b may include a Liquid Crystal Display (LCD), an Organic Light-Emitting Diode (OLED), a flexible display, a three-dimensional (3D) display or the like.

The printed circuit board 250, as aforementioned, may be formed on the one surface of the frame 230, but also be mounted onto a lower surface of the display module 210b. At least one electronic device may be mounted onto a lower surface of the printed circuit board 250.

The frame 230 may be provided with a receiving portion which is recessed to receive the battery 240 therein. A contact terminal connected to the printed circuit board 250 may be formed at one side surface of the battery receiving portion so as for the battery 240 to supply power to the terminal body.

The antenna device 241 may be formed at an upper end or a lower end of the mobile terminal. The antenna device 241 may be formed in plurality to be disposed at each end portion of the terminal. Each antenna device 241 may transmit or receive a wireless signal of a different frequency band.

The frame 230 may be formed of a metal to maintain a sufficient rigidity even if thin. The metallic frame 230 may operate as a ground. That is, the printed circuit board 250 or the antenna device 241 may be connected to the frame 230, and the frame 230 may operate as the ground of the printed circuit board 250 or the antenna device 241. Here, the frame 230 may thusly extend the ground of the mobile terminal.

Referring to FIGS. 4 and 5, an electric device 251 may be mounted onto one surface of the printed circuit board 250. The electric device 251 may be a communication microprocessor or a non-communication microprocessor which operates at high speed. Especially, the electric device 251 may be a communication chip including a modem chip, an RF transceiver chip or an RF receiver chip, and/or a power chip including a power amplifier (PA) chip or a power management IC (PMIC) chip. The communication chip and/or the power chip may generate a large quantity of heat during its operation. That is, in view of the characteristic of the terminal which is getting advanced, a wireless communication device consumes the high percentage of entire power used by the terminal and an absolute amount of power used by the wireless communication device increases as well. This accordingly causes an increase in the quantity of heat generated by the wireless communication device. Therefore, if the heat generated by the wireless communication device is effectively discharged to the outside of the terminal, the temperature of the terminal may be overall controlled within a stable range. The power chip which carries out power supply, conversion, rectification and charging with respect to the wireless communication device may also generate heat due to internal resistance. The terminal according to the one exemplary embodiment may effectively dissipate the heat generated by the electric device 251 to the outside of the terminal, resulting in overall controlling the temperature of the terminal into a stable range.

A sealing unit 252 and 253 for covering (shielding) the electric device 251 may be coupled to the printed circuit board 250. The sealing unit 252 and 253 may be made of a metal which is elastically transformable. The sealing unit 252 and 253 may also protect the electric device 251 disposed on the one surface of the printed circuit board 250 in a shielding manner.

In general, the printed circuit board 250 of the mobile terminal may include electronic circuits mounted thereon. Those circuits are sensitive to electromagnetic interference (EMI) and radio frequency interference (RFI). Especially, the RFI is generated by an internal interferer or external interferer of the terminal. Hence, a shielding structure is required for preventing the interference and protecting the electric device 251. As one of the shielding structure, the sealing unit 252 and 253 may be taken into account. The sealing unit 252 and 253 may be made of stainless or titanium without need of plating, and processed through a stage-based molding work using a pressing method.

Also, the sealing unit 252 and 253 may be faulted to shield each electric device 251, improving a specific absorption rate (SAR) characteristic.

The sealing unit 252 and 253 may include a first sealing portion 252 and a second sealing portion 253. The first sealing portion 252 may be coupled to one surface of the printed circuit board 250 to shield the electric device 251, and the second sealing portion 253 may be disposed on another surface of the printed circuit board 250 at a position facing the first sealing portion 252.

Hereinafter, the first sealing portion 252 may be exemplarily illustrated, but each configuration of the first sealing portion 252 may also be applied to the second sealing portion 253.

Referring to FIG. 6 and FIG. 8, a first heat transfer portion 252a and a second heat transfer portion 252b may be formed on one surface and another surface of the first sealing portion 252, respectively. The first heat transfer portion 252a may be located between the first sealing portion 252 and the frame 230. The first heat transfer portion 252a may be formed integrally with the first sealing portion 252 or integrally with the frame 230.

The second heat transfer portion 252b may be formed on one surface within the first sealing portion 252. The second heat transfer portion 252b may transfer heat generated from the electric device 251 to the first sealing portion 252. The heat transferred to the first sealing portion 252 may then be transferred to the first heat transfer portion 252a. Here, the first sealing portion 252 may be provided with a hole, through which the first heat transfer portion 252a and the second heat transfer portion 252b may be integrally connected to each other.

FIG. 6 exemplarily illustrates that the first heat transfer portion 252a is formed integrally with the sealing unit for convenience of explanation. The first heat transfer portion 252a or the second heat transfer portion 252b may have a heat transfer coefficient more than a predetermined value.

The first heat transfer portion 252a or the second heat transfer portion 252b may include at least one of a heat radiation sheet, a radiation lubricant, a heat conductive adhesive, a heat radiation gel, a heat radiation paint and a phase change material (PCM). A silicon-based or a carbon-based composite sheet or metallic sheet such as copper may be used as the heat radiation sheet.

The PCM refers to a material which adsorbs ambient thermal energy while a solid changes into a liquid phase. Accordingly, the temperature increasing due to heat generation by the electric device 251 may be maintained within a predetermined range. The PCM may be divided into an organic PCM and an inorganic PCM. The organic PCM may include, for example, n-paraffin group, pentaerythritol, polyethylene, acetic amide, naphthalene, stearic acid or the like. The organic PCM exhibits characteristics of low density and low latent heat flux, and has advantages of low corrosiveness and low volume expansion, as compared with the inorganic PCM. The inorganic PCM may include, for example, $MgCl_2 \cdot 6H_2O$, $Al_2(SO_4)_3 \cdot 10H_2O$, $NH_4Al(SO_4)_2 \cdot 12H_2O$ and the like. The inorganic PCM generally exhibits characteristics of high density and high latent heat flux, and has advantages of high corrosiveness and high volume expansion, as compared with the organic PCM.

Heat conductivity of the second heat transfer portion 252b may be higher than that of the first heat transfer portion 252a. This may allow heat within the sealing unit to be fast discharged to the outside. For example, the second heat transfer portion 252b may include a radiation gel having high heat conductivity. The first heat transfer portion 252a may be formed as a radiation sheet having low conductivity than that of the radiation gel.

FIG. 7 is a rear view of the frame 230. The display module 210b may be coupled to the rear surface of the frame 230. The rear surface of the frame 230 may be divided into two regions. The first region 231 may be a region with a heat transfer preventing portion 234, and the second region 232 may be a region where the frame 230 and the display module 210b are coupled to each other by an adhesive member such as an adhesive agent or a double-sided tape. That is, the adhesive member for coupling the frame 230 and the display module 210b to each other may be formed on the second region 232 surrounding the first region 231.

The heat transfer preventing portion 234 may be formed to prevent heat, which is transferred from the heat transfer portions 252a and 233 to the frame 230, from being transferred to the display module 210b. To this end, the heat transfer preventing portion 234 may include an air gap. The air gap is a space in which the frame 230 and the display module 210b are coupled to each other by use of the adhesive member, namely, a portion filled with air. A protrusion may be formed to define the space for forming the heat transfer preventing portion 234. The protrusion may protrude from the frame 230, such that the frame 230 can be spaced apart from the display module 210b. Also, when the frame 230 and the display module 210b are closely adhered with each other, the protrusion may seal the space where the air gap is formed. As a component for preventing heat transfer, the heat transfer preventing portion 234 may include an insulator having low heat conductivity.

A third heat transfer portion 233 may be formed between the heat transfer preventing portion 234 and the frame 230. The third heat transfer portion 233 may dissipate heat, which is transferred from the first heat transfer portion 252a to the frame 230, to surroundings. That is, the heat transfer portions 252a and 233 may be formed on both surfaces of the frame 230 such that heat transferred from the electric device 251 can be transferred to the whole frame 230.

A so-called hot spot whose temperature is drastically increasing at a predetermined portion thereof during operation of the electric device 251 may be formed on a part of the electric device 251. As aforementioned, the formation of the heat transfer portions 252a and 233 on the both surfaces of the frame 230 may prevent the drastic increase in the temperature of a predetermined region, and allow for even dissipation of heat transferred from the hot spot.

The frame 230 may be partially exposed to the exterior, which may allow heat transferred from the heat transfer portions 252a, 252b and 233 to be discharged to the outside.

Figure 9:
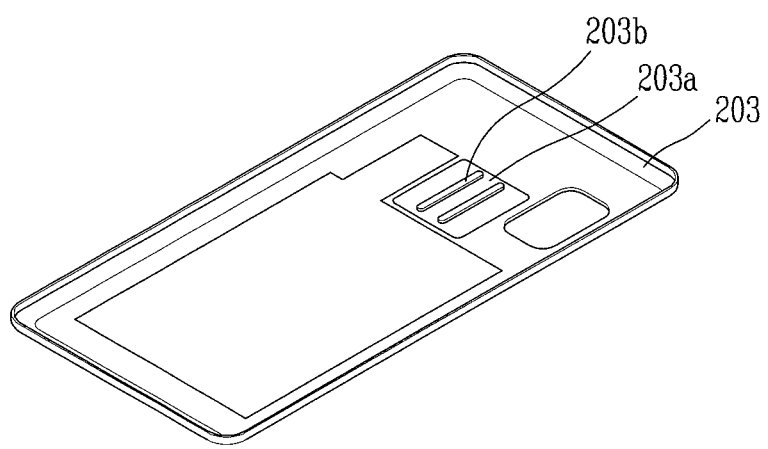
FIG. 9 is a rear perspective view of a battery case.

FIG. 9 is a rear perspective view of the battery case 203. Another heat transfer preventing portion 203a may be interposed between the battery case 203 and the rear case 202. The heat transfer preventing portion 203a may be located on a portion which perpendicularly extends from one surface of the printed circuit board 250 on which the electric device 251 is disposed. The formation of the heat transfer preventing portion 203a may block heat, which is transferred from the second sealing portion 253 toward the battery case 203 via the rear case 202.

To form the heat transfer preventing portion 203a, protrusions 203b may protrude from a rear surface of the battery case 203. With the formation of the protrusions 203b, an air gap may be formed between the battery case 203 and the rear case 202 in the coupled state of the battery case 203 and the rear case 202 to each other. That is, the air gap is a space which is formed between the battery case 203 and the rear case 202 as they are coupled to each other, namely, a portion filled with air. The protrusions 203b may protrude from the battery case 203, such that the battery case 203 can be spaced apart from the rear case 202. Also, when the battery case 203 and the rear case 202 are closely adhered with each other, the protrusions 203b may seal the space where the air gap is formed. Here, the protrusions 203b have been illustrated as protruding from the battery case 203, but different from the example, may protrude from the rear case 202.

Figure 10:
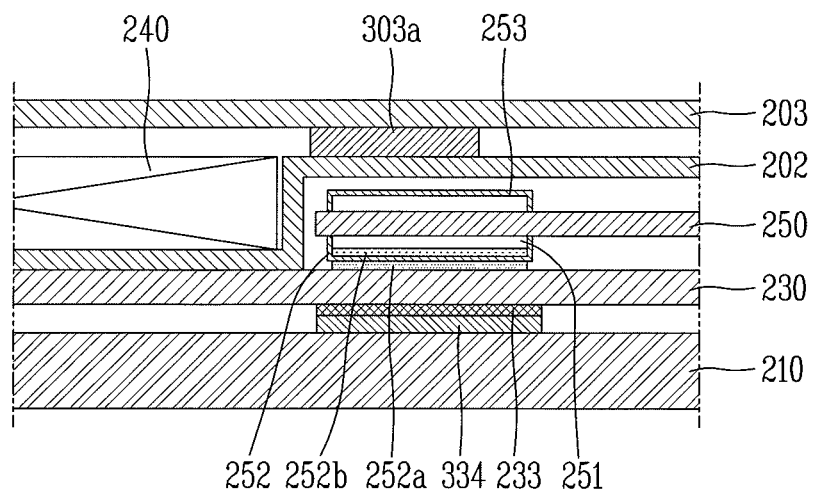
FIG. 10 is a view showing an exemplary variation of the present disclosure, namely, a sectional view taken along the line V-V of FIG. 3.
Figure 11:
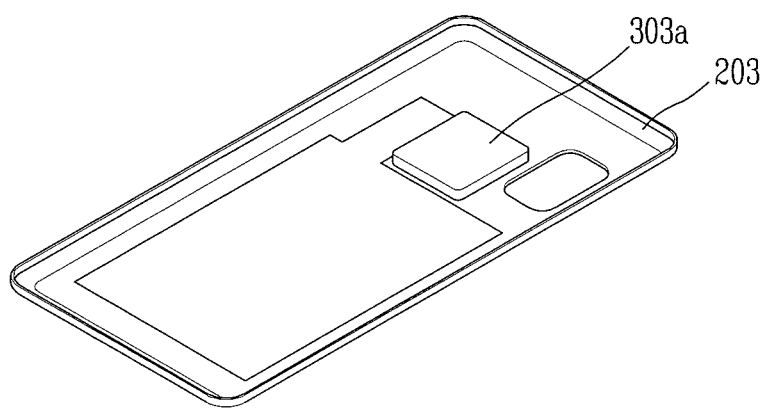
FIG. 11 is a view showing another exemplary variation of the present disclosure, namely, a rear perspective view of the battery case.

FIG. 10 is a view showing an exemplary variation of the present disclosure, namely, a sectional view taken along the line V-V of FIG. 3. FIG. 11 is a view showing another exemplary variation of the present disclosure, namely, a rear perspective view of the battery case 203. FIGS. 10 and 11 illustrate an example that heat transferred from the electric device 251 is blocked from being transferred to the battery case 203 or the display module 210b using insulators 303a and 334 each having low heat conductivity, without forming an air gap as shown in the foregoing embodiment.

That is, according to the exemplary variation, a first insulator 334 may be formed between the frame 230 and the display module 210b, and a second insulator 303a may be formed between the battery case 203 and the rear case 202.

Also, unlike the drawings, an air gap may be formed between the frame 230 and the display module 210b and an insulator may be interposed between the battery case 203 and the rear case 202, or an insulator may be interposed between the frame 230 and the display module 210b and an air gap may be formed between the battery case 203 and the rear case 202.

A material used as the insulator may include wool, paper, polyethylene, polyvinyl chloride or natural rubber which may form an air layer.

As described above, according to the exemplary embodiments of the present disclosure, an increase in internal temperature of the terminal due to heat generation by the electric device 251 may be prevented within a predetermined range.

The foregoing embodiments and advantages of the mobile terminal are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body;
   a display module located in the terminal body;
   a printed circuit board located within the terminal body;
   at least one electric device mounted on the printed circuit board;
   a sealing unit coupled to the printed circuit board to shield the electric device;
   a frame having a first surface contacting the sealing unit and a second surface coupled to the display module;
   a first heat transfer portion configured to transfer heat from the sealing unit to the frame, the first heat transfer portion being located on the first surface;
   a second heat transfer portion to transfer heat from the electric device to the sealing unit, the second heat transfer portion being formed on one surface within the sealing unit; and
   a heat transfer preventing portion configured to reduce the amount of heat transferred from the frame to the display module, the heat transfer preventing portion being located on the second surface, the heat transfer preventing portion overlapping the first heat transfer portion.

2. The terminal of claim 1, wherein the heat transfer preventing portion comprises an air gap to space the frame apart from the display module.

3. The terminal of claim 1, wherein the heat transfer preventing portion comprises an insulator interposed between the frame and the display module.

4. The terminal of claim 1, further comprising a battery located within the terminal body,
   wherein the terminal body includes a rear case and a battery cover to cover the battery and the rear case, and
   wherein the printed circuit board is disposed between the rear case and the frame.

5. The terminal of claim 4, further comprising a protrusion formed on a predetermined region of an inner surface of the battery cover such that an air gap is formed between the rear case and the battery cover, the predetermined region overlapping the heat transfer portion.

6. The terminal of claim 4, further comprising an insulator formed on a predetermined region of an inner surface of the battery cover so as to prevent heat from being transferred to an outer surface of the battery cover, the predetermined region overlapping the first heat transfer portion.

7. The terminal of claim 1, wherein heat conductivity of the second heat transfer portion is higher than that of the first heat transfer portion.

8. A mobile terminal comprising:
   a terminal body;
   a display module located in the terminal body;
   a printed circuit board located within the terminal body;
   at least one electric device mounted on the printed circuit board;
   a sealing unit coupled to the printed circuit board to shield the electric device;
   a frame having a first surface and a second surface;
   a first heat transfer portion being provided on the first surface of the frame, the first heat transfer portion being coupled to the sealing unit to radiate heat generated from the electric device;
   a second heat transfer portion to transfer heat from the electric device to the sealing unit, the second heat transfer portion being formed on one surface within the sealing unit; and
   an insulator coupled to the second surface of the frame to reduce the amount of heat transferred to the display module.

9. The terminal of claim 8, further comprising a battery located within the terminal body,
   wherein the terminal body includes a rear case and a battery cover to cover the battery and the rear case, and
   wherein the printed circuit board is disposed between the rear case and the frame.

10. The terminal of claim 9, further comprising an insulator formed on a predetermined region of an inner surface of the battery cover to prevent heat from being transferred to an outer surface of the battery cover.

11. The terminal of claim 8, wherein heat conductivity of the second heat transfer portion is higher than that of the first heat transfer portion.

12. A mobile terminal comprising:
    a terminal body;
    a display module located in the terminal body;
    a printed circuit board located within the terminal body;
    at least one electric device mounted on the printed circuit board;
    a frame;
    a sealing unit coupled to the frame to shield the electric device;
    a first heat transfer portion coupled to the frame to radiate heat generated from the electric device; and
    a second heat transfer portion to transfer heat from the electric device to the sealing unit, the second heat transfer portion being formed on one surface within the sealing unit,
    wherein the frame and the display module are arranged to provide an air gap therebetween to reduce heat transferred to the display module.

13. The terminal of claim 12, further comprising a battery located within the terminal body,
    wherein the terminal body includes a rear case and a battery cover to cover the battery and the rear case, and
    wherein the printed circuit board is disposed between the rear case and the frame.

14. The terminal of claim 12, wherein heat conductivity of the second heat transfer portion is higher than that of the first heat transfer portion.

* * * * *